United States Patent [19]

Hashizaki et al.

[11] 4,086,520
[45] Apr. 25, 1978

[54] SPEED AND PHASE CONTROL SYSTEM

[75] Inventors: Kazuo Hashizaki; Ryusuke Moriya, both of Tokyo, Japan

[73] Assignee: Sony Corporation, Tokyo, Japan

[21] Appl. No.: 659,363

[22] Filed: Feb. 19, 1976

Related U.S. Application Data

[63] Continuation-in-part of Ser. No. 509,828, Sep. 27, 1974, abandoned.

[30] Foreign Application Priority Data

Oct. 1, 1973 Japan ................................ 48-110338

[51] Int. Cl.² .............................................. H02P 5/16
[52] U.S. Cl. .................................... 318/269; 318/314
[58] Field of Search ............... 318/268, 269, 310, 311, 318/314, 318, 329, 603

[56] References Cited

U.S. PATENT DOCUMENTS

| 3,577,056 | 5/1971 | Tsujikawa | 318/314 |
|---|---|---|---|
| 3,621,353 | 11/1971 | Matley | 318/314 |
| 3,842,326 | 10/1974 | Stocker | 318/318 X |
| 3,895,277 | 7/1975 | Klumpp | 318/269 |
| 3,958,271 | 5/1976 | Sumiyoshi | 318/314 X |

*Primary Examiner*—Robert K. Schaefer
*Assistant Examiner*—W. E. Duncanson, Jr.
*Attorney, Agent, or Firm*—Lewis H. Eslinger; Alvin Sinderbrand

[57] ABSTRACT

In an apparatus having at least one rotary head for reproducing video signals recorded in successive parallel tracks extending obliquely across a tape which is advanced longitudinally and also has control signals recorded therein in predetermined positional relationship to the respective record tracks to be reproduced by a fixed transducer or head with a repetition rate that is dependent on the speed of advancement of the tape: a speed and phase control system for the rotary head or heads has a rotational speed detector for producing pulse signals representative of the rotational position of each rotary head and having a repetition rate that is a function of the rotational speed of the rotary head; a phase comparator for producing a phase responsive signal having a voltage level that is varied in response to changes in the relative timing of the reproduced control signals and the pulse signals; a digital device for producing a speed responsive signal having a voltage level that generally corresponds to the repetition rate of the pulse signals, but which is varied in response to changes in the repetition rate of the pulse signals only when such changes occur without corresponding changes in the repetition rate of the reproduced control signals; and a brake or other means for controlling the rotation of the rotary head in response to the voltage levels of the phase responsive signal and the speed responsive signal. In a preferred embodiment, the digital device for producing the speed responsive signal includes a source of clock pulses, a counter for counting the clock pulses for time intervals determined by the repetition rate of the pulse signals from the rotational speed detector, a digital-analog converter for converting the count of the counter, at the end of the mentioned time intervals, to a corresponding voltage level of the speed responsive signal, and an arrangement for establishing the initial count of the counter at the commencement of each of the time intervals in dependence on the repetition rate of the reproduced control signals.

6 Claims, 8 Drawing Figures

SPEED AND PHASE CONTROL SYSTEM

This is a continuation-in-part of application Ser. No. 509,828, filed 9/27/74 now abandoned.

BACKGROUND OF THE INVENTION

1. Field of the Invention

This invention relates generally to video tape apparatus, and more particularly is directed to a system for controlling both the phase and speed of the rotary head or heads of such apparatus by means, such as a brake, but with the speed signal being derived so that, if, for example, the information was recorded with the tape running at a speed different from the customary speed, the tape can be run at such different speed during reproducing or playback without adversely affecting the phase of the rotating head.

2. The Prior Art

Video tape apparatus normally includes a supply of tape on which information signals may have been recorded previously or may be recorded by the apparatus itself. The tape is wrapped in a helical path at least partially around a drum with which one or more rotary heads or transducers are associated to move in a circular path in a plane that intersects the longitudinal direction of the helically wrapped tape. As the tape is advanced longitudinally by a capstan that normally operates at a fixed speed, video or information signals are recorded by the rotary head or heads in successive parallel tracks that extend obliquely across the surface of the tape, and control signals are recorded by a fixed head or transducer along one edge of the tape so as to be in predetermined positional relation to the oblique tracks. Since the information signals and the control signals are recorded while the tape is moving, the distance between the positions of the successive control signals on the tape are determined by the speed at which the tape is moving. The control signals to be recorded may be derived from pulse signals generated in a magnetic pick-up device located adjacent the rotary shaft of the rotary head or heads to thereby correlate the speed and phase angle of the rotating head or heads with the speed and linear position of the tape during recording.

During playback of the recorded tape, the same type of pulse generator or rotational speed detector produces pulse signals having a repetition rate that is a function of the speed of rotation of the magnetic head or heads. These pulse signals also indicate a specific angular, or phase position of each rotating head at the time each pulse signal is generated. The pulse signals are compared in phase with the control signals reproduced from the tape to provide a phase responsive signal which corresponds to the relative position, or phase, of the rotating head and the linear position of the tape. The phase responsive signal thus derived is employed to control or regulate a brake to slow down the rotation of the reproducing head or heads to a greater or lesser degree as necessary to cause each head to start to scan a slant area of the tape at a point that corresponds to the start of one of the oblique tracks in which video or other information signals are recorded on the tape.

The playback or reproducing apparatus further includes means responsive to the pulse signals from the rotational speed detector to produce a signal responsive to the speed of rotation of the head or heads so that the slant area traversed by each head will not only start at the same point as the beginning of a respective one of the oblique tracks in which video signals were previously recorded, but will continue directly along such oblique tracks. The speed responsive signal, as well as the phase responsive signal, is applied to the brake to affect its operation.

With the above described speed and phase control or servo system of the prior art, for example, as disclosed in U.S. Pat. No. 3,495,152, or in U.S. Pat. No. 3,836,756, if the tape was originally recorded with a rotary head rotating at the standard speed of, for example, 30 r.p.s., then, during correct reproduction of such tape, the reproduced control signals and the pulse signals have repetition rates of 30Hz with a predetermined phase difference therebetween. So long as the pulse signals have a repetition rate of 30Hz and there is the predetermined phase difference between the control signals and the pulse signals, the voltage of the speed responsive signal and the voltage of the phase responsive signal combine to produce a brake control voltage or signal by which the phase and speed of rotation are maintained correct. If the rotating speed of the head is, for example, momentarily reduced below the standard speed, the voltages of the speed responsive signal and phase responsive signal are suitably changed to vary the brake control voltage or signal so as to restore the correct phase and speed relationships.

However, if the tape was originally recorded while being advanced at an incorrect speed, for example, at a speed slightly less than the standard speed, the spacing between the recorded control signals is correspondingly reduced, so that, during reproduction with the tape being advanced at the standard speed, such control signals have an increased repetition rate, for example, of 30.1 Hz., and in order to correctly scan the resulting oblique record tracks, the rotary head or heads must rotate at a relatively increased speed at which the pulse generator or rotational speed detector produces the pulse signals with a repetition rate of 30.1 Hz. Such increased repetition rate of the pulse signals causes a decrease in the speed responsive voltage so that, in the absence of any change in the voltage of the phase responsive signal, the brake control voltage or signal would be varied in the direction to increase the braking force and thereby reduce the rotational speed of the rotary head. Thus, the phase responsive signal compensates for the decrease of the voltage of the speed responsive signal, and this is achieved at the expense of changing the phase difference between the control signals and the pulse signals so that the rotated head no longer accurately scans the oblique tracks on the magnetic tape.

OBJECTS AND SUMMARY OF THE INVENTION

Accordingly, it is an object of this invention to provide a speed and phase control or servo system for a reproducing apparatus which avoids the above described problem encountered with the prior art systems.

More specifically, it is an object of this invention to provide a speed and phase control or servo system for a reproducing apparatus having at least one rotary head for reproducing information signals recorded in successive parallel tracks on a recorded medium, and in which the record medium may be advanced during reproducing of the recorded signals as a speed different from that employed during recording of the signals without adversely affecting the phase relationship of the rotary head to the record tracks.

Another object is to provide a speed and phase control or servo system, as aforesaid, which includes digital components so as to avoid control errors due to temperature changes or operating voltage variations, and further to facilitate the production of at least such digital components as integrated circuits.

In accordance with an aspect of this invention, in an apparatus for reproducing information signals recorded in successive parallel tracks on a record medium along with respective control signals recorded on the record medium in predetermined positional relationship to the record tracks, and in which rotary transducer means is provided for scanning the tracks in succession so as to reproduce the information signals recorded therein as the record medium is advanced, and fixed transducer means is provided for reproducing the control signals with a repetition rate that is dependent on the speed of advancement of the record medium and the spacing of the recorded control signals along the record medium: a speed and phase control system for the rotary transducer means comprises a rotational speed detector for producing pulse signals representative of the rotational position of the rotary transducer means and having a repetition rate that is a function of the rotational speed of said rotary transducer means; phase comparison means for producing a phase responsive signal having a voltage level that is varied in response to changes in the relative timing of said reproduced control signals and said pulse signals; means for producing a speed responsive signal including a source of clock pulses, counting means for counting said clock pulses for time intervals determined by said repetition rate of said pulse signals from the rotational speed detector, means for converting the count of said counting means, at the end of each of said time intervals, to a corresponding voltage level of said speed responsive signal, and means for establishing the initial count of said counting means at the commencement of each of said time intervals in dependence on said repetition rate of said reproduced control signals so that the voltage level of said speed responsive signal is varied in response to changes in said repetition rate of the pulse signals only when said changes occur without corresponding changes in said repetition rate of the reproduced control signals; and means, such as a brake, for controlling the rotation of said rotary transducer means in response to the voltage levels of said phase responsive signal and said speed responsive signal.

The above, and other objects, features and advantages of the invention, will be apparent in the following detailed description of an embodiment of the invention which is to be read in connection with the accompanying drawings.

DESCRIPTION OF A PREFERRED EMBODIMENT

Figure 1:
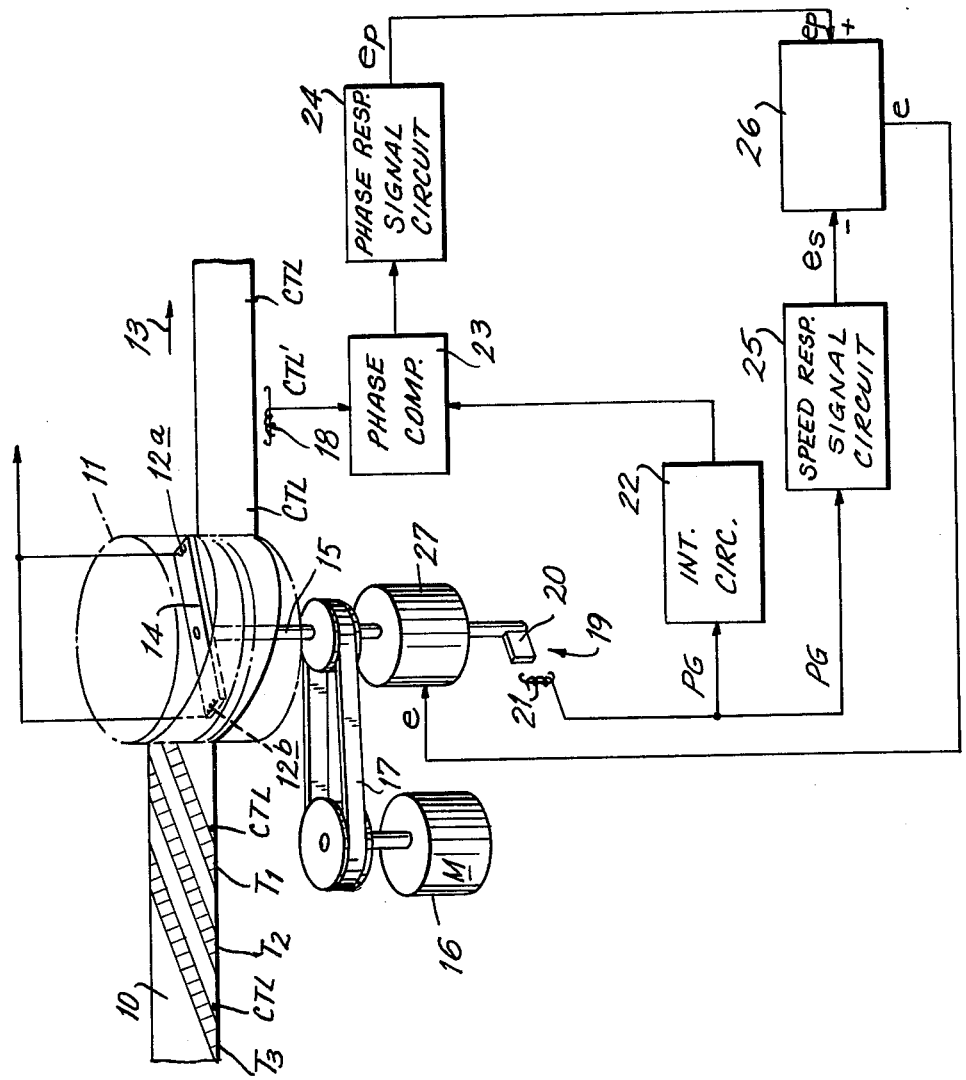
FIG. 1 is a schematic view illustrating a video tape reproducing apparatus with a phase and speed control or servo system according to the prior art.

Referring initially to FIG. 1, it will be seen that, in a conventional apparatus for reproducing video signals recorded on a tape 10, the tape is wrapped in a helical path at least partially around a guide drum 11 (shown in broken lines) with which rotary heads or transducers 12a and 12b are associated to move in a circular path in a plane that intersects the longitudinal direction of the helically wrapped tape. As the tape is advanced longitudinally in the direction of the arrow 13 on FIG. 1, as by a capstan (not shown), the substantially diametrically opposed heads 12a and 12b are rotated to alternately scan successive areas extending obliquely across the tape. As is shown, the heads 12a and 12b may be mounted at the opposite ends of a support arm 14 which, at its center, is mounted on a rotary shaft 15 coaxial with guide drum 11. The shaft 15, and hence the heads 12a and 12b, may be driven by a motor 16 through a belt and pulley transmission 17.

An arrangement similar to that described above may be employed for recording the video signals on tape 10 in successive tracks $T_1,T_2,T_3$—etc. extending obliquely across the tape. In the case of recording NTSC video signals made up of 30 frames of video signal information per second, with each frame being comprised of two fields, it is conventional to record one field in each of the oblique record tracks, and further to record a control signal CTL along one edge of the tape 10 at least at the commencement of each frame so as to be in predetermined positional relationship to the respective oblique record track. If recording heads similar to the above described heads 12a and 12b are used for recording fields of the video signals in the respective tracks $T_1,T_2,T_3$—etc., such recording heads are rotated at a speed of 30 r.p.s. and each of the intervals between the successive control signals CTL is 1/30 second, with the spacing between the successive control signals CTL, as recorded alomg the tape 10, and the slope of the oblique record tracks $T_1,T_2,T_3$—etc. being dependent upon the speed at which the tape is longitudinally advanced during the recording of the signals thereon.

When reproducing the video signals thus recorded in the successive oblique record tracks $T_1,T_2,T_3$—etc. it is necessary that the rotational movements of the reproducing heads 12a and 12b be controlled so that each of the heads 12a and 12b will commence to scan across the tape 10 precisely at the beginning of a respective one of the oblique record tracks and will move precisely along such record track. In order to provide such tracking control, a phase and speed control or servo system according to the prior art is shown to include a fixed head or transducer 18 disposed adjacent the path of the tape 10 and being operative to reproduce the control signals CTL. It will be apparent that the rate of repetition of the reproduced control signals CTL' is determined by the spacing between the recorded control signals CTL on the tape 10 and the speed at which the tape is advanced during the reproducing operation. Of course, if the speed of advancement of the tape 10 is precisely the same during the recording and reproducing operations, then, in the example given above, the reproduced control signals CTL' will have a repetition rate of 30 Hz.

Further, the servo or tracking control system according to the prior art is shown to include a pulse generator or rotational speed detector 19 for producing pulse signals PG representative of the rotational positions of the heads 12a and 12b and having a repetition rate that is a function of the rotational speed of the rotary heads 12a and 12b. As shown, the pulse generator 19 may be constituted by a permanent magnet 20 fixed on shaft 15 to turn with the latter, and a coil 21 located adjacent the circular path of travel of magnet 21 to produce a pulse signal PG at each instant that one of the heads, for example, the head 12a, commences its scanning movement across tape 10.

In the known phase and speed servo or tracking control system, the pulse signals PG from generator 19 are applied to an integrating circuit 22 and the output of the latter is applied to a phase comparator 23 which also receives the reproduced control signals CTL' from fixed head 18. The phase comparator 23 detects the phase difference or relative timing between the integrated pulse signals PG and the reproduced control signals CTL' and causes a circuit 24 to produce a phase responsive signal $e_p$ having a voltage level determined by the detected phase difference. Thus, the voltage level of the phase responsive signal $e_p$ has a predetermined value when each of the heads 12a and 12b commences its scanning movement across the tape 10 at the beginning of a respective one of the oblique record tracks on the tape. The pulse signals PG from generator 19 are also applied to a circuit 25 which produces a speed responsive signal $e_s$ having a voltage level determined by the rotational speed of the rotary heads 12a and 12b, with the voltage level of such signal $e_s$ decreasing with increases in the rotational speed of the rotary heads. The phase responsive signal $e_p$ and the speed responsive signal $e_s$ are applied to respective inputs of a brake control circuit 26 which combines the input signals to provide a corresponding brake control or regulating signal $e$ which is applied to a brake 27 on the shaft 15 for slowing down the rotation of heads 12a and 12b to a greater or lesser degree in dependence on the voltage level of brake control signal $e$.

Figure 2A:
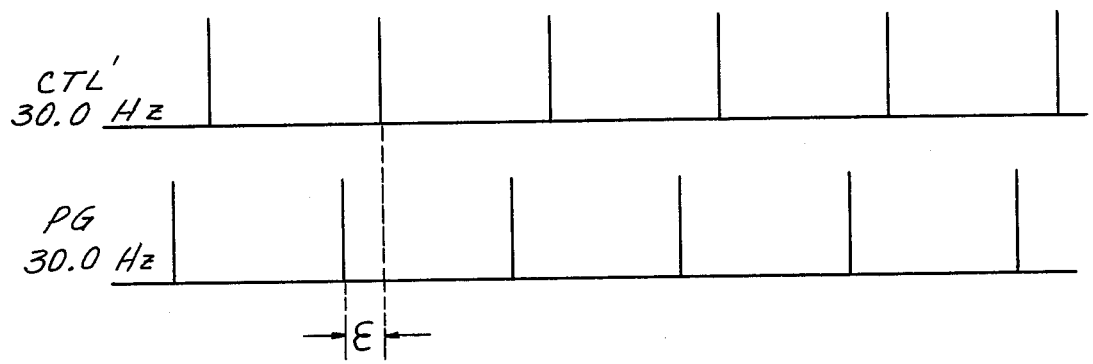
FIGS. 2A and 2B show the relationships of reproduced control signals and of pulse signals representing the rotational speed and phase of a rotary head with the servo system of FIG. 1, and to which reference will be made in explaining a problem encountered with such servo system of the prior art.

If the video signals were recorded in tracks $T_1, T_2, T_3$—etc. on tape 10 by recording heads rotated at the standard speed of 30 r.p.s. while the tape was longitudinally advanced at the standard speed, and if the tape is again advanced at such standard speed during the reproducing of the recorded video signals, then a typically correct relative timing of the reproduced control signals CTL' and of the pulse signals PG may be as shown on FIG. 2A. As indicated, the reproduced control signals CTL' have a repetition rate of 30 Hz for the case of advancement of the tape at the same standard speed during reproducing as during recording, and the pulse signals PG have a repetition rate of 30 Hz corresponding to the rotation of heads 12a and 12b at 30 r.p.s. Further, when each of the rotary heads 12a and 12b commences its movement across tape 10 precisely at the beginning of a respective one of the oblique record tracks in which a field interval of the video signals is recorded, the difference in timing between the reproduced control signals CTL' and the pulse signals PG has the predetermined value $\epsilon$. Such relative timing or phase difference $\epsilon$ and the proper rotating speed (30 r.p.s.) of the rotary heads provide the phase responsive signals $e_p$ and the speed responsive signal $e_s$ with respective voltage levels which, in the brake control circuit 26, result in a voltage level of the brake control signal $e$ for causing the brake 27 to maintain both the correct phase difference or relative timing $\epsilon$ and the correct rotational speed (30 r.p.s.).

For example, in the phase and speed control or servo system of FIG. 1, the integrating circuit 22 may be effective to produce a sawtooth waveform from the pulse signals PG, while the phase comparator 23 is operative to detect the voltage of such sawtooth waveform at the occurrence of each of the reproduced control signals CTL' and the voltage detected by phase comparator 23 is converted in circuit 24 to the phase responsive signal $e_p$ having a voltage which increases with increasing values of the timing difference $\epsilon$. Further, the brake control circuit 26 may be a subtracting circuit or a summing circuit in which the speed responsive signal $e_s$ is added, with its polarity reversed, to the phase responsive signal $e_p$ for producing the brake control signal $e$ which, in the brake 27, applies a braking force of increasing values for increasing voltages of the signal $e$. It will be apparent that, with the foregoing arrangement, a momentary reduction in the rotational speed of the heads 12a and 12b and the corresponding reduction in the repetition rate of the pulse signals PG will reduce the phase difference $\epsilon$ between the pulse signals PG and the reproduced control signals CTL' and cause a corresponding reduction in the voltage of phase responsive signal $e_p$. At the same time, the reduced rotational speed of heads 12a and 12b and the corresponding reduction in the repetition rate of pulse signals PG will cause an increase in the voltage of speed responsive signal $e_s$. The reduced voltage of the phase responsive signal $e_p$ and the increased voltage of the speed responsive signal $e_s$ will result in a decrease in the voltage of the brake control signal $e$ so that the braking force of brake 27 is correspondingly reduced to cause restoration of the correct phase and speed relationships.

Figure 2B:
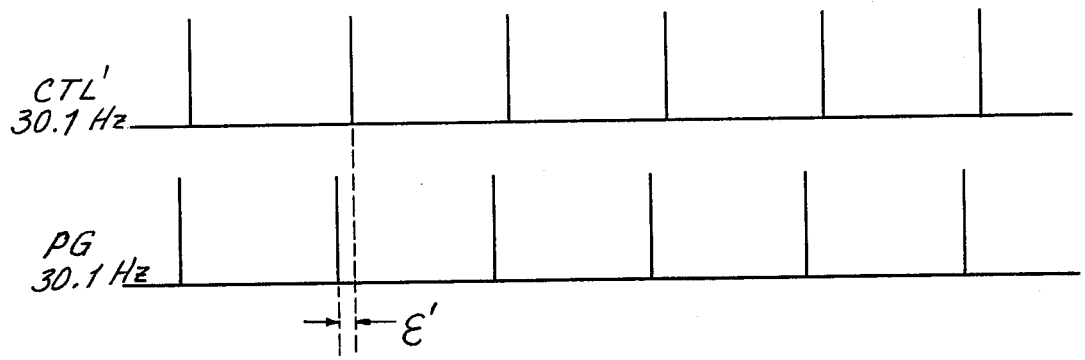

However, if the video or other information signals were recorded on the tape while the latter was being advanced at other than the standard speed, the known phase and speed servo system will not be effective to maintain the proper phase relationships during reproducing of the video signals with the tape being advanced at the standard speed. For example, if the speed of advancement of the tape during recording is lower than the standard speed, the recorded control signals CTL will be relatively closely spaced apart along the tape and, therefore, during the reproducing of the signals recorded on such tape with the latter being advanced at the standard speed, the repetition rate of the reproduced control signals CTL' will be relatively high, for example, 30.1 Hz. as shown on FIG. 2B, rather than the repetition rate of 30.0 Hz. with which the control signals were recorded on the tape. Since the recorded control signals CTL are in predetermined positional relationships to the oblique record tracks $T_1, T_2, T_3$—etc. on the tape, the rate at which such record tracks have to be scanned by the rotary heads 12a and 12b is similarly increased, that is, the heads 12a and 12b have to be rotated at 30.1 r.p.s. at which speed the pulse signals PG from pulse generator or rotational speed detector 19 have a repetition rate of 30.1 Hz., as also shown on FIG. 2B. With such increase in the repetition rate of pulse signals PG, the speed responsive signal $e_s$ undergoes a corresponding decrease in its voltage so that the brake control signal $e$ from circuit 26 tends to increase for increasing the force of brake 27 so as to return the rotational speed of heads 12a and 12b to the standard speed of 30.0 r.p.s. Such slowing down of the rotation of heads 12a and 12b is accompanied by a decrease in the repetition rate of the pulse signals PG relative to the repetition rate of the reproduced control signals CTL' so as to decrease the timing difference therebetween, with the result that the voltage of the phase responsive signal $e_p$ is reduced to decrease the brake control signal $e$ and, hence, the braking force applied to shaft 15.

Finally, the known control or servo system is stabilized with the brake control signal $e$ having a reduced voltage that permits rotation of the heads 12a and 12b at the speed of 30.1 r.p.s., and with the reduced voltage of the speed responsive signal $e_s$ resulting from the repetition rate of 30.1 Hz. of the pulse signal PG being compensated by a reduced voltage of the phase responsive signal $e_p$ that results from a change in the phase or timing difference $\epsilon'$ (FIG. 2B) between the reproduced control signals CTL' and the pulse signals PG. Since the phase or timing difference $\epsilon'$ is different, for example, smaller than the predetermined timing difference $\epsilon$ (FIG. 2A) required to ensure that each of the rotary heads 12a and 12b will commence its movement across tape 10 precisely at the beginning of one of the oblique record tracks on the tape, it will be seen that the heads 12a and 12b will not accurately scan such record tracks.

Although the inability of the known phase and speed control or servo system to cause accurate scanning of the record tracks by the rotary heads 12a and 12b has been specifically explained above for the case where the tape is recorded while being advanced at less than the standard speed used during reproducing of the recorded signals, the same problem arises in any case where the speeds of advancement of the tape are different for recording and reproducing, respectively, or where the rotary heads used for recording the tape are rotated at a speed other than the standard speed of 30 r.p.s.

Generally, in accordance with this invention, the above described problem is avoided in a phase and speed control or servo system of the described type by controlling the production of the speed responsive signal $e_s$ so that the latter is varied only in response to changes in the repetition rate of the pulse signals PG occurring without corresponding changes in the repetition rate of the reproduced control signals CTL'. More particularly, and with reference to FIG. 3 in which various components of a video tape reproducing apparatus having a phase and speed control or servo system according to the present invention are identified by the same reference numerals as the corresponding components of the prior art arrangement of FIG. 1, it will be seen that such phase and speed control or servo system is further provided with a device or circuit 28 which receives the reproduced control signals CTL' from fixed head 18 and, in response to the repetition rate of such signals CTL', suitably controls or presets the associated speed responsive signal circuit 25' so that the speed responsive signal $e_s$ issuing from the latter will be varied in response to changes in the repetition rate of the pulse signals PG only when such changes occur without a corresponding change in the repetition rate of the reproduced control signals CTL'.

Figure 3:
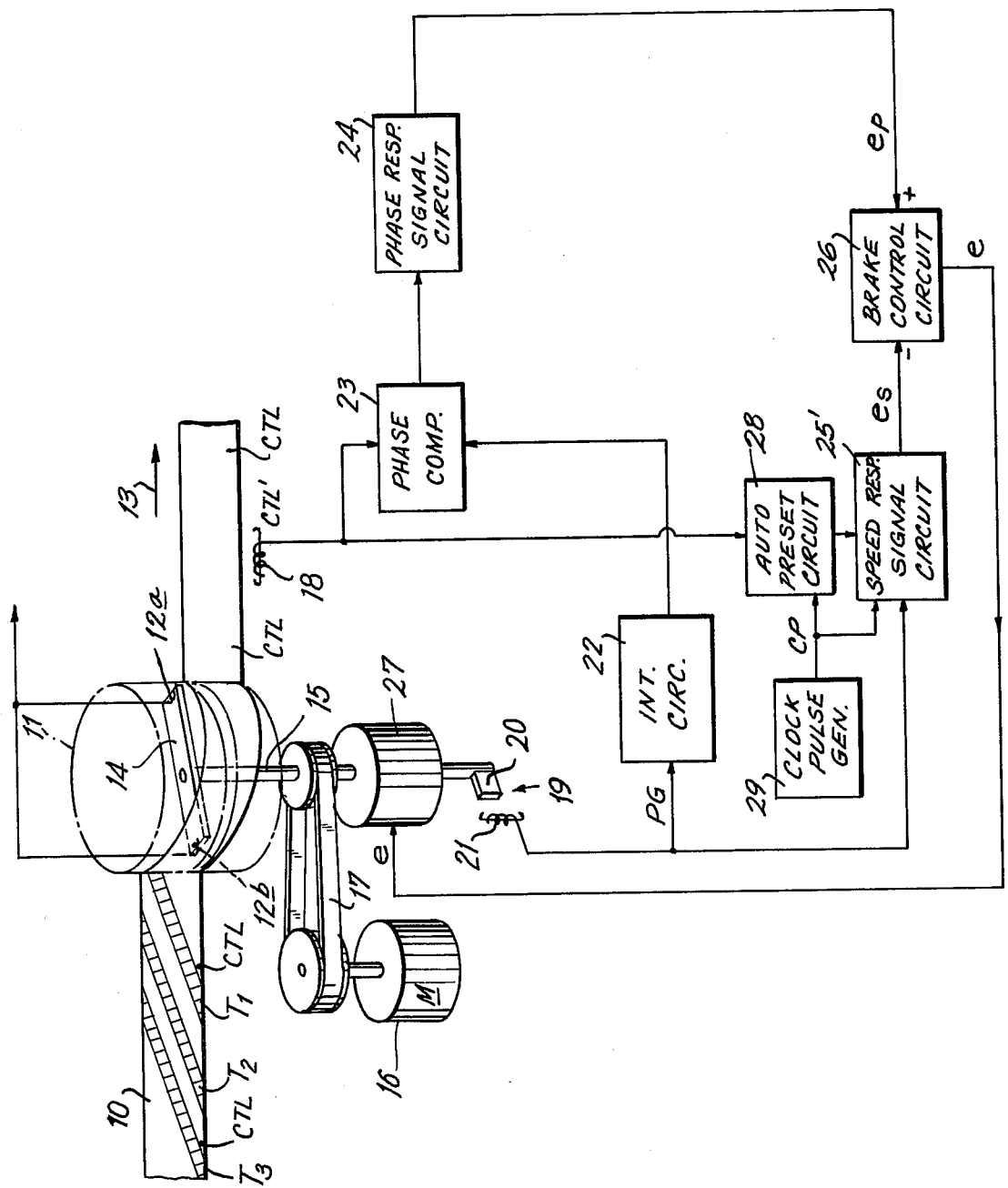
FIG. 3 is a schematic view similar to that of FIG. 1, but illustrating a phase and speed control or servo system according to the present invention.
Figure 4:
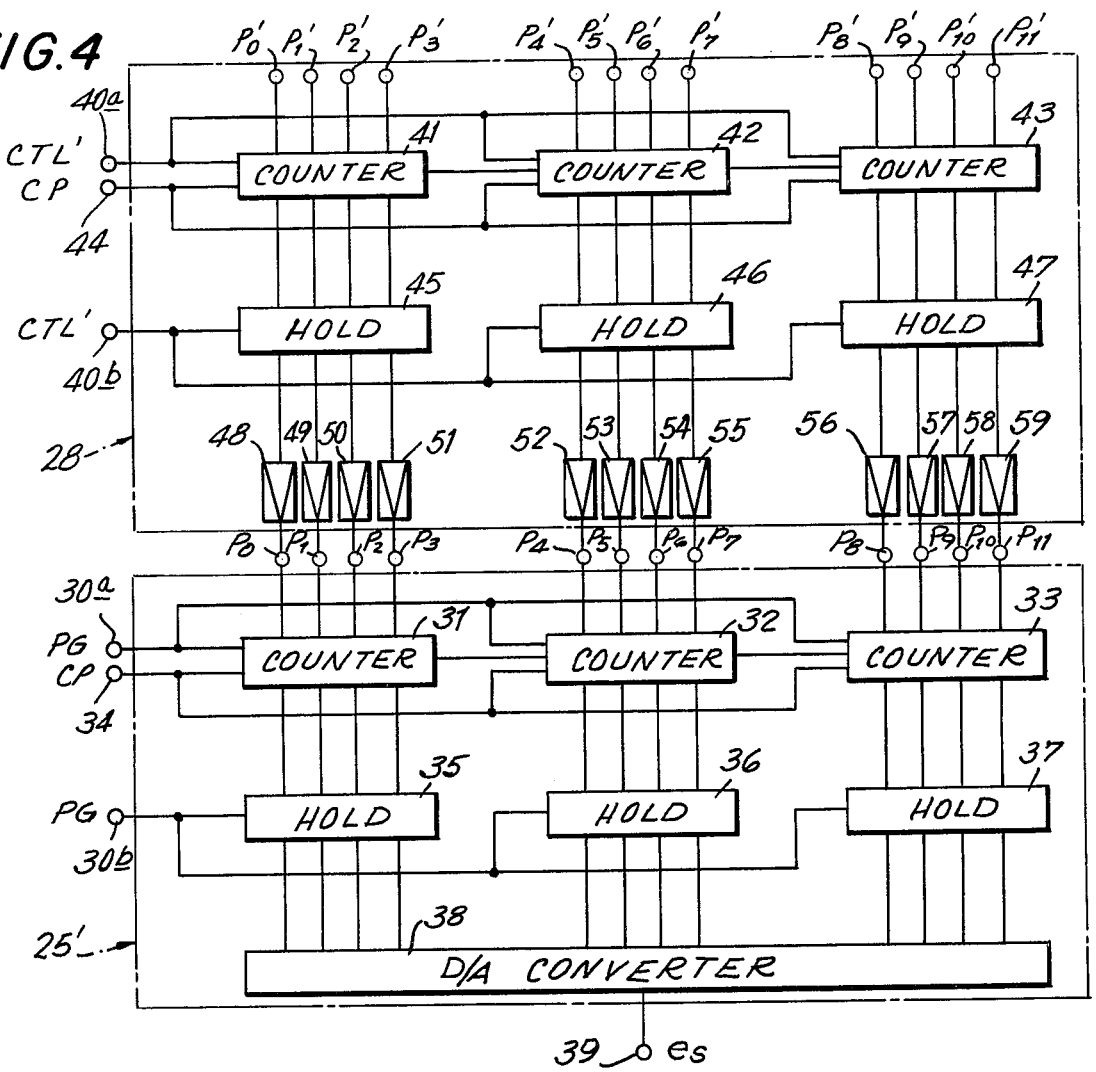
FIG. 4 is a block diagram of a digital circuit provided with an automatic preset circuit and which is employed for producing a speed responsive signal in the phase and speed control system in accordance with a preferred embodiment of this invention.

As is shown on FIG. 4, in a preferred embodiment of this invention, the circuit 25' for generating the speed responsive signal $e_s$ may be a digital arrangement comprising an input terminal 30a receiving the pulse signals PG from pulse generator 19 and being connected to three four-bit counters 31, 32 and 33. Clock pulses CP having a much higher repetition rate than the pulse signals PG are applied from a clock pulse generator 29 (FIG. 3) to another input terminal 34 which is connected to the counters 31, 32 and 33. The counters 31, 32 and 33 also have a number of preset terminals $P_0-P_{11}$, one for each of the four-bits of each counter.

Output terminals of the counters 31, 32 and 33 are connected to respective hold circuits 35, 36 and 37 to which the pulse signals PG are also applied by way of an input terminal 30b. The hold circuits 35, 36 and 37 have four-bit output terminals corresponding to the four-bit output terminals of the counters 31, 32 and 33, and the output terminals of the hold circuits are connected to suitable input terminals of a digital-to-analog (D/A) converter 38. This converter has an output terminal 39 from which the speed responsive signal $e_s$ is obtained.

Figure 5:
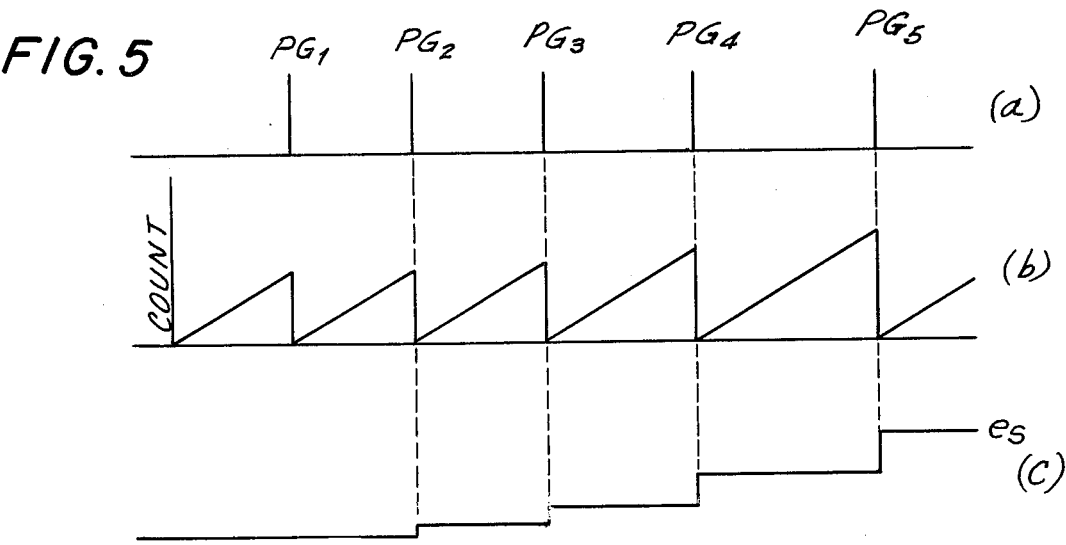
FIG. 5 shows waveforms to which reference will be made in exploring the operation of the digital circuit of FIG. 4.

Assuming for the time being that the automatic preset circuit 28 is omitted and that the preset starting count levels applied to all of the preset terminals $P_0-P_{11}$ are zero, the application of the successive pulse signals $PG_1-PG_5$ (FIG. 5a) to the input terminals 30a and 30b of circuit 25' will cause the counters 31-33 to count the clock pulses CP applied to terminal 34 as shown on FIG. 5(b). Although this counting is actually binary counting, it is represented on FIG. 5(b) as if each clock pulse produced an incremental increase in the voltage level and was returned to zero at the occurrence of each pulse signal PG. The level returns to zero at each pulse signal PG because of the assumption that the preset starting count levels applied to the terminals $P_0-P_{11}$ are zero. The increments may be considered so small and the clock pulse frequency so high that the voltage level appears to increase smoothly. Thus, the counters 31-33 count the numbers of clock pulses CP for time intervals determined by the repetition rate of the pulse signals PG, which time intervals are shown on FIG. 5(a) to be progressively increasing. In the interval between the first and second pulse signals $PG_1$ and $PG_2$, the voltage level rises to a certain value that may be considered the standard value corresponding to rotation of the heads 12a and 12b and 30.0 r.p.s. The interval between pulse signals $PG_2$ and $PG_3$ is relatively longer, indicative of a decreasing rotational speed of heads 12a and 12b, and, therefore, the voltage level has time to build up to a higher level as the counters 31-33 count to a larger number. This continues during the progressively increasing intervals from the pulse signal $PG_3$ to the pulse signal $PG_4$ and from the pulse signal $PG_4$ to the pulse signal $PG_5$.

The peak value of the count at the end of each counting cycle is converted by the D/A converter 38 to a voltage represented by the step wave in FIG. 5(c). As a result of the increasing counts, the level of the speed responsive voltage or signal $e_s$ increases. When such speed responsive signal $e_s$ of progressively increasing voltage is applied to brake control circuit 26, the brake control signal $e$ issuing from circuit 26 has its voltage progressively reduced to decrease the force of brake 27 and permit the return of the speed of rotation of heads 12a and 12b to the desired value.

Of course, if the preset starting count levels applied to the preset terminals $P_0-P_{11}$ are maintained at zero, as assumed above for the above description of the operation of circuit 25', the voltage level of the produced speed responsive signal $e_s$ will vary with changes in the repetition rate of the pulse signals PG whether or not such changes are accompanied by corresponding changes in the repetition rate of the reproduced control signals CTL', with the result that the problem described above with reference to FIGS. 1 and 2 will be encountered. However, in accordance with the present invention, the automatic preset circuit 28 is operative to preset the starting count levels applied to the preset terminals $P_0-P_{11}$ at the commencement of the intervals between successive pulse signals PG in dependence on the repetition rate of the reproduced control signals CTL', that is, in dependence on the intervals between successive signals CTL'.

More particularly, as shown on FIG. 4, the automatic preset circuit 28 has an input terminal 40a which receives the reproduced control signals CTL' and is connected to three four-bit counters 41,42 and 43 which also receive the clock pulses CP through an input terminal. The counters 41,42 and 43 have preset terminals $P'_0-P'_{11}$ which are all preset to the same starting value $n'$. The four-bit output terminal of the counters 41,42 and 43 are connected to respective input terminals of three hold circuits 45,46 and 47 which also receive the reproduced control signals CTL' from an input terminal 40b. Individual inverters 48-59 connect the respective four output terminals of the hold circuits 45-47 to the automatic preset terminals $P_0-P_{11}$ of the counters 31-33 in the circuit 25'.

Figure 6A:
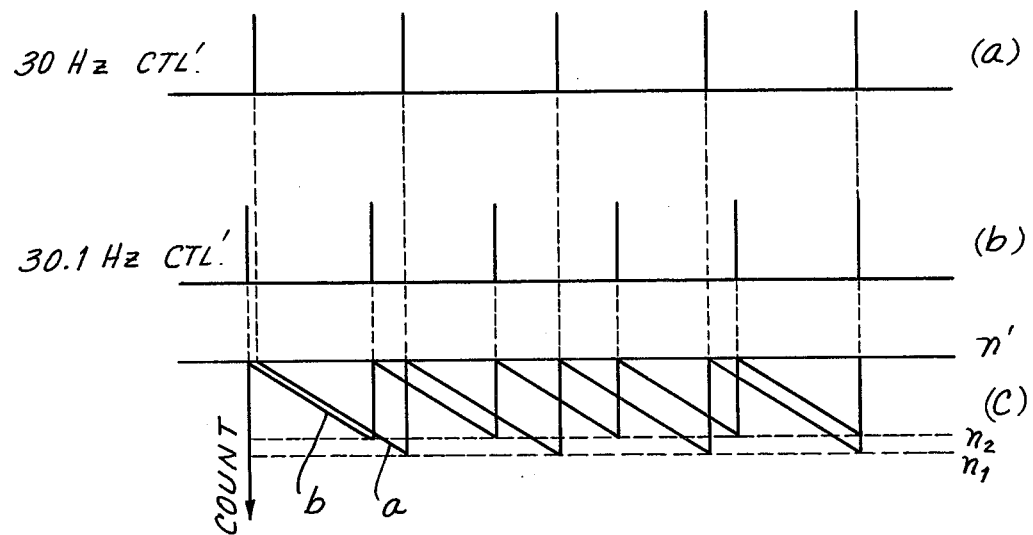
FIGS. 6A and 6B show waveforms to which reference will be made in explaining the operation of the automatic preset circuit of FIG. 4.
Figure 6B:
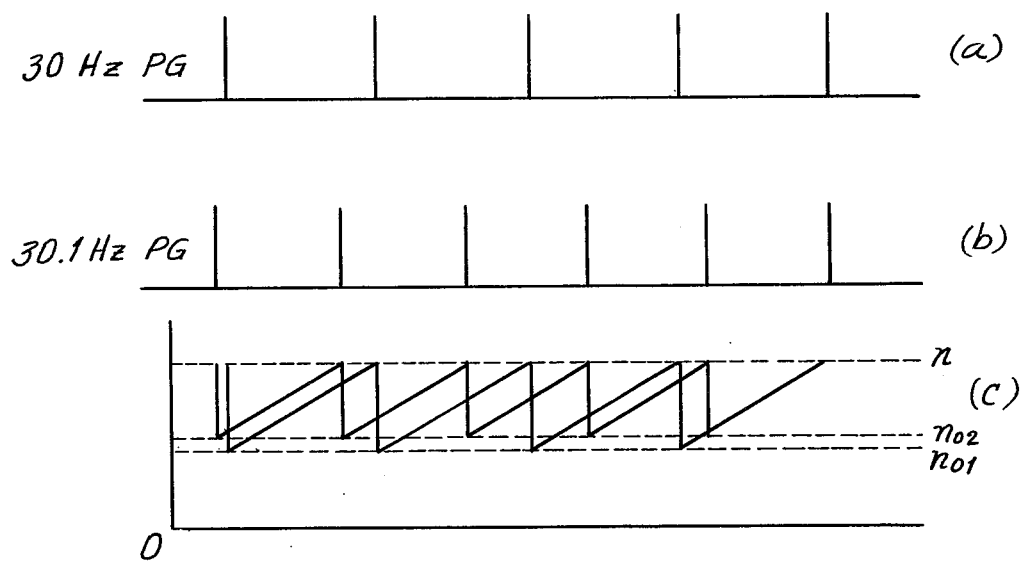

The operation of the automatic preset circuit 28 will now be described with reference to FIG. 6A on which reproduced control signals CTL' having the standard repetition rate of 30.0 Hz. are indicated at (a) and reproduced control signals CTL' having other than the standard repetition rate, for example, a repetition rate of 30.1 Hz., are indicated at (b). With the counters 41-43 having their preset terminals $P'_0-P'_{11}$ all set to the same starting count or value $n'$ and being operative to count down the clock pulses CP from that starting value during each interval between successive reproduced control signals CTL', it will be apparent that, at the end of each such interval, the output signals from counters 41-43 will be decreased from the value $n'$ to an extent dependent on the length of the counting interval. Thus, as indicated at (c) on FIG. 6A, if the reproduced control signals CTL' have the standard repetition rate of 30.0 Hz., the count value decreases to $n_1$ along the line $a$; whereas, if the reproduced control signals CTL' have the repetition rate of 30.1 Hz., the count value decreases along the line $b$ only to the value $n_2$. At the end of each counting cycle, the reproduced control signal CTL' then applied to hold circuits 45-47 causes the final count value, whatever its level may be, to be applied through inverters 48-59 to the preset terminals $P_0-P_{11}$ for determining the starting count levels of the counters 31-33 in circuit 25'. Thus, as shown at (c) on FIG. 6B, if the reproduced control signals CTL' have the repetition rate of 30.0 Hz. and cause the counters 45-47 to count down to the level $n_1$, the starting count level of the counters 31-33 will be $n_{01}$. On the other hand, if the reproduced control signals have the repetition rate of 30.1 Hz. and cause the counters 45-47 to count down to the level $n_2$, then the starting count level of the counters 31-33 will be $n_{02}$ which is higher than the starting count level $n_{01}$. By reason of the foregoing, if the reproduced control signals CTL' have the repetition rate of 30.1 Hz., the counters 31-33 will count to the same level $n$ on FIG. 6B during each interval between the successive pulse signals PG having the repetition rate 30.1 Hz., as indicated at (b) on FIG. 6B, as the counters 31-33 count to during each interval between the successive pulse signals PG having the repetition rate of 30.0 Hz. if, in the latter case, the reproduced control signals CTL' have the repetition rate of 30.0 Hz. Since the counters 31-33 count to the same level $n$ it will be apparent that no change will occur in the speed responsive signal $e_s$ derived from D/A converter 38 so long as the change in rotational speed of heads 12a and 12b, and hence the change in the repetition rate of the pulse signals PG is accompanied by a corresponding change in the repetition rate of the reproduced control signals CTL'.

It will be apparent from the above that, with the phase and speed control or servo system according to this invention as shown on FIGS. 3 and 4, the phase or timing difference $\epsilon$ between the reproduced control signals CTL' and the pulse signals PG required to ensure that each of the heads 12a and 12b will commence its scanning movement across the tape 10 precisely at the beginning of one of the oblique record tracks on the tape is maintained so long as the reproduced control signals CTL' and the pulse signals PG have the same repetition rates. Thus, if in reproducing signals recorded on the tape 10, the reproduced control signals CTL' have a repetition rate, such as, 30.1 Hz., which is different from the standard repetition rate of 30.0 Hz., the rotational speed of heads 12a and 12b will be suitably maintained, for example, at 30.1 r.p.s., to provide the pulse signals PG with the repetition rate of 30.1 Hz., and the timing difference $\epsilon$ will be also maintained to ensure accurate tracking of the oblique record tracks by the rotary heads.

Of course, if the rotational speed of the rotary heads 12a and 12b is momentarily varied so that the repetition rate of the pulse signal PG changes relative to the repetition rate of the reproduced control signals CTL', then the voltage of the speed responsive signal $e_s$ issuing from circuit 25' will be suitably changed to vary the brake control voltage $e$, and hence the braking force resulting therefrom, in the sense for returning the rotational speed of the heads 12a and 12b to the value that causes the pulse signals PG to again have the same repetition rate as the reproduced control signals CTL'. For example, if, during a reproducing operation in which the reproduced control signals CTL' have the repetition rate 30.1 Hz. to provide the counters 31-33 with the starting count $n_{02}$, the rotational speed of heads 12a and 12b is momentarily slowed from the desired speed of 30.1 Hz., the interval between successive pulse signals PG will be increased with the result that counters 31-33 will count above the level $n$ and cause a corresponding increase in the voltge of speed responsive signal $e_s$. Such increase in the voltage of signal $e_s$ will result in a decrease in the voltage of brake control signal $e$ for decreasing the braking force and thereby permitting return of the speed of heads 12a and 12b to the desired value of 30.1 r.p.s.

Accordingly, it will be seen that the servo system according to this invention is effective to maintain the rotational speed of rotary heads 12a and 12b in synchronism with the rate of repetition of the reproduced control signals CTL' and also to maintain the proper phase relationship for accurate scanning of the record tracks on the tape even though the rate of repetition of the signals CTL' may depart from the standard by reason of differences between the speeds of advancement of the tape for recording and reproducing, respectively, or for other reasons.

Although a specific embodiment of the invention has been described in detail herein with reference to the accompanying drawings, it is to be understood that the invention is not limited to that precise embodiment, and that various changes and modifications may be effected therein by one skilled in the art without departing from the scope and spirit of the invention as defined in the appended claims.

What is claimed is:

1. In an apparatus for reproducing information signals recorded in successive parallel tracks on a record medium along with respective control signals recorded on the record medium in predetermined positional relationship to said tracks, and in which the apparatus includes rotary transducer means for scanning said tracks in succession so as to reproduce the information signals recorded therein as the record medium is advanced, and fixed transducer means for reproducing said control signals with a repetition rate that is dependent on the speed of advancement of the record medium: a speed and phase control system for said rotary transducer means comprising rotational speed detector means for producing pulse signals representative of the rotational position of said rotary transducer means and having a repetition rate that is a function of the rotational speed of said rotary transducer means; phase comparison means for producing a phase responsive signal having a voltage level that is varied in response to changes in the relative timing of said reproduced control signals and said pulse signals; means for producing a speed responsive signal including a source of clock pulses, counting means for counting said clock pulses for time intervals determined by said repetition rate of said pulse signals from the rotational speed detector means, means for converting the count of said counting means, at the end of each of said time intervals, to a corresponding voltage level of said speed responsive signal, and means for establishing the initial count of said counting means at the commencement of each of said time intervals in dependence on said repetition rate of said reproduced control signals so that the voltage level of said speed responsive signal is varied in response to changes in said repetition rate of the pulse signals only when said changes occur without corresponding changes in said repetition rate of the reproduced control signals; and means for controlling the rotation of said rotary transducer means in response to the voltage levels of said phase responsive signal and said speed responsive signal.

2. An apparatus according to claim 1; wherein said means for controlling the rotation of said rotary transducer means comprises braking means for braking said rotary transducer means.

3. An apparatus according to claim 2; wherein said means for controlling the rotation of said rotary transducer means further comprises an adder connected to said phase comparison means and to said means for converting the count of said counting means, the output of said adder being connected to said braking means for regulating the latter.

4. An apparatus according to claim 1; wherein said counting means includes a first digital counter, and said means for converting the count includes a digital-analog converter.

5. An apparatus according to claim 4; wherein said means for establishing the initial count of said counting means includes a second digital counter for counting said clock pulses for time intervals determined by said repetition rate of said reproduced control signals and correspondingly establishing said initial count of the first digital counter.

6. An apparatus according to claim 1; in which the record medium is in the form of a tape which is advanced longitudinally and has said successive parallel tracks extending obliquely thereacross, said information signals are video signals having predetermined intervals thereof recorded in said successive tracks, respectively, said rotary transducer means includes a rotary drum having the tape guided in a helical path about a portion of the drum periphery and at least one reproducing head on said drum to repeatedly scan across the tape in said path, and said means for controlling the rotation of the rotary transducer means includes braking means for braking the rotation of said drum and each said head and an adder receiving said phase responsive signal and said speed responsive signal for producing a brake control signal by which the braking force of said braking means is regulated.

* * * * *